United States Patent [19]
Ueda et al.

[11] Patent Number: 5,975,539
[45] Date of Patent: *Nov. 2, 1999

[54] COMPOSITE GASKET

[75] Inventors: Katsunori Ueda; Shiunichi Searashi, both of Toyota; Takahiro Niwa, Yokohama, all of Japan

[73] Assignee: Nichias Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,399

[22] Filed: May 9, 1997

[30] Foreign Application Priority Data

May 16, 1996 [JP] Japan .................................. 8-146763

[51] Int. Cl.⁶ .............................. F02F 11/00; F16J 15/12
[52] U.S. Cl. ........................... 277/593; 277/627; 277/652
[58] Field of Search .................................... 277/592, 593, 277/598, 600, 609, 627, 630, 640, 651, 652, 654

[56] References Cited

U.S. PATENT DOCUMENTS

| | | | |
|---|---|---|---|
| 3,655,210 | 4/1972 | Farnam et al. | 277/593 |
| 3,863,936 | 2/1975 | Farnam et al. | 277/166 |
| 3,889,961 | 6/1975 | Farnam | 277/592 |
| 3,927,429 | 12/1975 | Pearson | 4/213 |
| 4,049,856 | 9/1977 | Adams | 277/235 |
| 4,088,347 | 5/1978 | Bruggemann et al. | 277/609 |
| 4,290,616 | 9/1981 | Nicholson | 277/235 |
| 4,546,033 | 10/1985 | Tsuchimoto et al. | 277/592 |
| 4,625,979 | 12/1986 | Inciong | 277/180 |
| 4,754,982 | 7/1988 | Udagawa et al. | 277/235 B |
| 4,765,633 | 8/1988 | Hossack | 277/600 |
| 4,810,591 | 3/1989 | Sakai | 277/235 |
| 4,834,399 | 5/1989 | Udagawa et al. | 277/593 |
| 4,896,891 | 1/1990 | Udagawa | 277/593 |
| 5,106,107 | 4/1992 | Justus et al. | 277/235 B |
| 5,121,933 | 6/1992 | Silvers | 277/235 |
| 5,150,910 | 9/1992 | Udagawa | 277/592 |
| 5,286,039 | 2/1994 | Kawaguchi et al. | 277/593 |
| 5,468,003 | 11/1995 | Staab et al. | 277/235 |
| 5,482,298 | 1/1996 | Udagawa | 277/600 |
| 5,628,113 | 5/1997 | Tanaka et al. | 277/180 |
| 5,634,645 | 6/1997 | Seki et al. | 277/627 |
| 5,634,646 | 6/1997 | Miyaoh | 277/592 |
| 5,713,580 | 2/1998 | Ueta | 277/593 |
| 5,722,670 | 3/1998 | Novak et al. | 277/235 |

FOREIGN PATENT DOCUMENTS

| | | |
|---|---|---|
| 259 794 | 3/1988 | European Pat. Off. . |
| 464 888 | 1/1992 | European Pat. Off. . |
| 35 09 136 | 9/1986 | Germany . |
| 38 02 090 | 8/1989 | Germany . |
| 2 019 507 | 10/1979 | United Kingdom . |

*Primary Examiner*—Steven Meyers
*Assistant Examiner*—Teri Pham
*Attorney, Agent, or Firm*—Flynn, Thiel, Boutell & Tanis, P.C.

[57] ABSTRACT

A cheap composite gasket is constructed in such manner that the sealing property and the vibration isolation are compatible. So, in the composite gasket, NBR rubber acting as a first hard elastic member is arranged at a position of a bolt portion, while NBR foam rubber acting as a second soft elastic member is disposed at a position of a liquid sealing portion, in a central core member consisting in a stainless steel plate.

15 Claims, 6 Drawing Sheets

BOLT PORTION    SEAL PORTION

COMPOSITE GASKET

FIELD OF THE INVENTION

The present invention relates to a gasket for floating (vibration isolation) for various parts around an automobile motor, etc. (e.g. head cover, intake manifold, gear case, oil pan, etc.) and in particular to a composite gasket suitable for isolating transmitted vibration and for sealing them to prevent leak of liquid in an automobile engine etc.

DESCRIPTION OF THE PRIOR ART

Characteristics of a gasket required from a point of view of sealing material are as follows:
(1) that torque-down of a bolt portion is small and that clamping force of a bolt is maintained in a long term;
(2) that fitness and following property with respect to a sealing surface of a flange are good so as to be able to absorb roughness of the surface and flatness of the flange;
(3) that it has a sufficient robustness so that no break, etc. take place by movements due to an inner pressure, thermal deformation of the flange, etc.;
(4) that there is no leak through the sealing material itself; etc.

On the other hand, characteristics of a gasket required from a point of view of floating (vibration isolation) material are as follows:
(1) that it has a low spring constant (soft) so that a resonance frequency can be shifted towards the lower frequency side;
(2) that it has a high loss factor as a viscous elastic body and a high vibration absorbing capacity; etc.

However, among the characteristics described above, there are many characteristics, which are incompatible with each other for satisfying simultaneously different requirements from the two points of view.

Straight forwardly speaking, for the sealing material "fitness" and "robustness" including resiliency after deterioration are required, while for the vibration isolating material "softness" is required. In general, a soft vibration isolating material is easily buckled, which is incompatible particularly with "robustness".

Heretofore various gasket materials have been devised and used in order to satisfy either one of the two groups of requirements. One of them is a gasket made of a soft material, which is prepared by mixing fiber and others with a rubber elastic substance and formed in a sheet-shape. However a gasket thus obtained is necessarily hard in order to improve torque-down and tensile strength of the bolt portion thereof and therefore it is short of vibration isolation.

By using a gasket obtained by coating a metal plate with a thin rubber layer, which is vulcanized thereafter, not only robustness is increased significantly owing to the metal plate, but also a good fitness can be obtained owing to the rubber layer. In addition, it is hardly influenced by creep, because the rubber layer is thin. Although performance of the sealing property can be improved by subjecting it to a bead process, it is short of vibration isolation, corresponding to the thin rubber layer.

Further, since a gasket, in which a metal plate is coated with foam rubber has a high sealing property even if it is not subjected to a bead process, a low spring constant owing to foam rubber, and also a good vibration isolation, it can be said that it is efficient means in a low load environment. However, since it is easily buckled, it has a great torque-down in the bolt portion and in practice environment, in which it can be used, is limited.

On the contrary, a major part of gaskets, which have been developed for the main purpose of vibration isolation, are formed so that the vulcanized rubber layer is rather thick. Therefore it is a matter of course that it has a vibration isolation effect and it can be said that fitness thereof with the flange surface is good.

However, since it is compressed remarkably, there is a risk that it is clamped too much at clamping. In this case, since vibration isolation is worsened, the rubber is broken at the worst case, further it has generally a great permanent compression stress (it is easily buckled), etc., when creep takes place, not only it is possible that insufficiency in the sealing property is produced, but also the bolt can fall off. Since, particularly in order to prevent the latter, a so-called size limiting mechanism should be used, etc., it can be said that this raises fabrication cost and it is desired to solve the problem.

As described above, by a prior art gasket, it is difficult to reconcile the sealing property and the vibration isolation (floating) and if it is tried to meet the two groups of requirements, fabrication cost is raised and in reality it is short of practical usefulness.

SUMMARY OF THE INVENTION

An object of the present invention is to provide a composite gasket capable of realizing compatibility from this point of view at a low cost.

That is, the main object of the present invention is to provide an epoch-making gasket material having a high sealing property and a good vibration isolation at the same time, for which it is possible to suppress torque-down of the bolt portion, even if it is subjected to a thermal deterioration in a long term, and in addition to realize a cost reduction.

In order to achieve the above object, a composite gasket comprises a central core member having a bolt portion, a liquid sealing portion, etc.; a first elastic member disposed at the bolt portion of the central core member, which is hard, having a small compression deformation; and a second elastic member disposed at the liquid sealing portion apart from the bolt portion, which is soft, having a high fitness, wherein the second elastic member is as thick as or thicker than the first elastic member.

A composite gasket is further characterized by the first elastic member being made of vulcanized rubber; the second elastic member being made of foam rubber; and the central core member being a metal plate; in which the vulcanized rubber and the foam rubber are adhered to the bolt portion and the liquid sealing portion, respectively, on both the surfaces of the metal plate.

A composite gasket is further characterized by a bead being formed along the periphery of the sealing portion in the metal plate acting as the central core member.

A composite gasket is further characterized by the metal plate acting as the central core member being a spring steel plate.

A composite gasket is further characterized by a first sheet member, in which a first elastic member, relatively hard and having a small elastic deformation, being adhered to a first metal plate; and a second sheet member, in which a second elastic member, which is soft and has a high fitness, being adhered to a second metal plate, wherein the first and the second sheet member are linked to each other at positions, where functions of the bolt portion and the sealing portion are not obstructed, and the second elastic member is as thick as or thicker than the first elastic member.

A composite gasket is further characterized in that, in the invention defined by claim 5, the first elastic member is made of vulcanized rubber and the second elastic member is made of foam rubber.

A composite gasket is further characterized by a central core member having a bolt portion, a liquid sealing portion, etc.; a first sheet member, in which a first elastic member relatively hard having a small elastic deformation is adhered to a metal plate; and a second sheet member, in which a second elastic member, which is soft and has a high fitness, is adhered to a second metal plate, wherein the first and the second sheet member are superposed on both the surfaces of the central core member and the second elastic member is as thick as or thicker than the first elastic member.

A composite gasket is further characterized by the central core member is a metal plate and the first and the second sheet member are adhered to both the surfaces of the metal plate or linked mechanically relatively loosely thereto at positions, where functions of the bolt portion and the sealing portion are not obstructed.

A composite gasket is further characterized by a bead is formed along the periphery of the sealing portion in the metal plate acting as the central core member.

A composite gasket is further characterized by the metal plate acting as the central core member is a spring steel plate.

A basic constructional requirement of the composite gaskets according to the inventions is to construct a composite gasket formed in one body suitable for desired uses by using a first elastic member, relatively hard and having a small compression deformation, for the bolt portion in the gasket and a second elastic member, which is soft and has a high fitness, for the liquid sealing portion or the vibration isolating portion in the gasket and by disposing these first and second elastic members combined with each other on a plane.

Consequently, in a mode of realization of the composite gaskets according to the present inventions, a metal plate, e.g. a stainless steel plate or a spring steel plate, having the bolt portion, the liquid sealing portion, etc. is used for the central core member and the first and the second elastic member are adhered to the bolt portion and the liquid sealing portion, respectively, in the metal plate.

Or the first and the second sheet member are formed by adhering the first and the second elastic member to the first and the second metal plate, respectively, which are disposed on the bolt portion and the liquid sealing portion in the gasket, respectively, and linked to each other at positions where functions thereof are not obstructed.

In this case, using a metal plate acting as the central core member, the first and the second sheet member may be superposed thereon. The first and the second sheet member are adhered to both the surfaces of the central core metal plate, or they are joined in one body by using relatively loose joining means such as mechanical caulking, etc. at positions where functions of the bolt portion and the sealing portion are not obstructed.

For the composite gasket according to the present invention it is possible to improve the sealing property and to supplement the self holding property of shape by forming a bead along the periphery of the sealing portion in the metal plate acting as the central core member.

The basic constructional requirement of the composite gasket according to the present invention consists in the first and the second elastic member and when raw materials are selected for realizing the present invention, any quality and any combination of the selected raw materials may be used, if they are suitable for utilization environment, taking a resistance to environment, etc. into account. For example, for a gasket used in an extremely low load environment, "hardness" of the first hard elastic member is not necessarily so high with respect to a gasket used in a high load environment and it is sufficient, if it is harder than the second soft elastic member used at the same time.

When a gasket is used in an immersion environment in oil, gasoline, etc., both the first and the second elastic member should withstand it under required conditions such as temperature, etc.

For the reasons described above following raw materials can be cited as those used for the composite gasket according to the present invention.

For the first elastic member vulcanized rubbers (NBR, ACM, EPDM, FKM, silicone, etc.) and other macromolecular materials (resins) can be used and it is possible to give them softness for the second elastic member by foaming them. Suitableness thereof can be determined, depending on various properties of matter such as hardness, spring constant, amount of compression deformation, permanent compression stress after the thermal deterioration, etc.

Further, recently, raw materials (rubber coated metals), in which metal plates are coated with these elastic materials, which are vulcanized if necessary, are supplied stably, and it is possible to improve the self shape holding property at the same time and to secure stable quality by using them. Thus it can be said that they are efficient means.

Metal plates used here are cold rolled steel plates, aluminium plates, stainless steel plates, copper plates, zinc galvanized steel plates, etc., among which suitable plates may be selected, depending on required environments.

As a material for the central core member, particularly in case where a bead is formed thereon and bead recovery force is used efficiently, a stainless steel plate is useful. If it is important to satisfy only the self shape holding property, the central core member may be an aluminium plate or a plastic plate. On the other hand, if it is not necessary to take rust into account, a cold rolled steel plate can be used also without any problem.

Further, as means for joining these raw materials in one body for constructing a gasket, adhesive is used; nails are raised and the raw materials are caulked; the raw materials are superposed on each other and caulked in one body while being extruded; the raw materials are secured to each other in one body by means of eyelets, rivets or grommets; etc. Any means may be used, if a plurality of raw materials are not separated from each other.

However, if appropriate raw materials can be located at predetermined positions where they are required, when the gasket is mounted on a flange, it is not necessary that all the constructional raw materials of a gasket according to the present invention are secured to each other in one body, but they can be secured to each other in one body by any method, depending on requirements at that time.

According to the present invention, torque-down at the bolt portion causing worsening the sealing property is suppressed and at the same time it is prevented that different metal plates are brought into contact by disposing the first hard elastic member at the bolt portion, which is useful also to the vibration isolation.

Further, by disposing the second soft elastic member at the sealing portion, fitness to the sealing surface and at the same time the resonance frequency can be shifted towards the lower frequency side, which increases the vibration isolation.

In addition, by using the central core member, it becomes easier to arrange the first hard elastic material and the second soft elastic material on a plane and it is possible also to achieve a robustness necessary for the self shape holding.

Further, by forming a bead on the central core member, since superficial sealing can be transformed into linear sealing, it is possible to supplement deficiency in the sealing property. For flanges moving specifically violently, by forming a bead on a spring steel plate such as stainless steel plate, etc. acting as the central core member, resiliency of the bead can be increased and it is possible also to increase the following property of the gasket to flange behavior.

In addition, it is useful at following points to use a sheet plate, to the two surfaces of which the first hard elastic member and/or the second soft elastic member are previously adhered;

(1) that even if the central core member is not necessarily used together, it is possible to increase the self shape holding property;
(2) that, since it is possible to arrange the different elastic members separately on both the surfaces of a metal plate, each layer can be made thinner than a single layer of each of the different elastic members and flow accompanied by clamping bolts can be suppressed by adhering them solidly; and
(3) that, in case where the central core member is used together, since it is possible to superpose the elastic members, divided further into a plurality of layers, this is useful for increasing the sealing property and the vibration isolation and even at a place where a great thickness is required, adjustment is possible by regulating the thickness of the central core member.

The first hard elastic material means an elastic material such as vulcanized rubber, etc. having a high hardness and a high tensile strength as well as a small amount of compression deformation and a small amount of permanent compression stress and it is possible to improve further these characteristics by coating a metal plate therewith.

On the other hand, the second soft elastic material means an elastic material such as vulcanized rubber, etc. having a low hardness and a low spring constant, specifically excellent in the fitness and among others foam rubber, etc. has high values of these characteristics. It is possible also to supplement deficiencies in tensile strength, flow, etc. by coating specifically thinly the metal plate therewith.

DESCRIPTION OF THE PREFERRED EMBODIMENTS

Hereinbelow several embodiments of the present invention and examples for comparison, with which they are compared, indicated in the figures will be explained.

Figure 1:
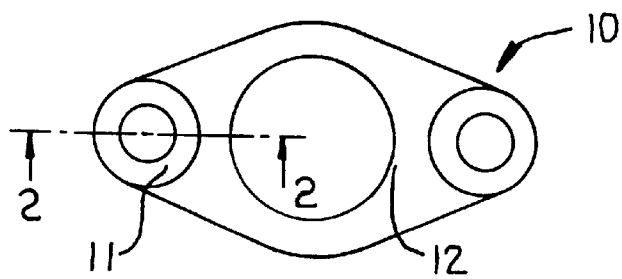
FIG. 1 is a plan view of a first embodiment of the present invention.
Figure 2:
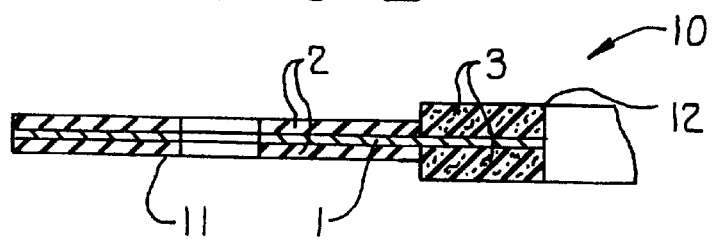
FIG. 2 is an enlarged view showing a part of a cross-sectional construction along line 2—2 in FIG. 1.
Figure 3:
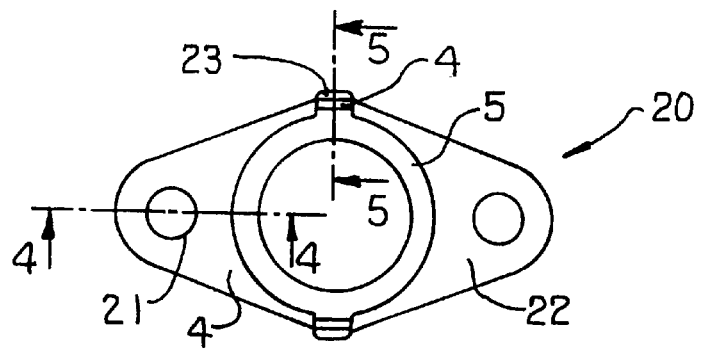
FIG. 3 is a plan view of a second embodiment of the present invention.
Figure 4:
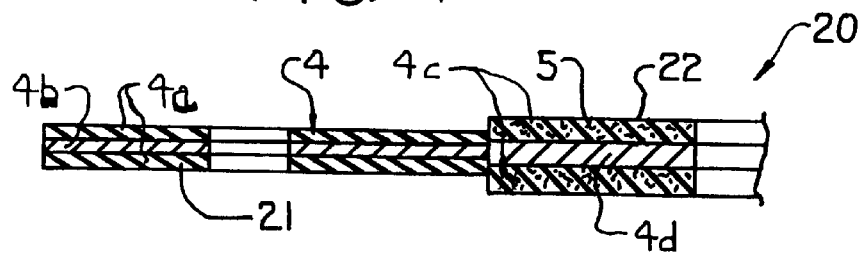
FIG. 4 is an enlarged view showing a part of a cross-sectional construction along line 4—4 in FIG. 3.

FIGS. 1 and 2 show a first embodiment for a composite gasket 10 used in an apparatus around an automobile motor such as an intake manifold according to the present invention. In the figures, reference numeral 1 indicates a central core member, for which a stainless steel plate (SUS301H) having a bolt portion 11 and a liquid sealing portion 12 is used for the purpose of preventing production of rust. 2 is a first hard elastic member, for which an NBR rubber is used, and which is disposed at the place of the bolt portion 11. 3 is a second soft elastic member, for which an NBR rubber, to which foaming agent is added, is used, and which is disposed at the position of the liquid sealing portion 12.

For fabricating the composite gasket constructed as described above, for example, raw materials, which are a stainless steel plate 1 acting as the central core member 1, an NBR rubber acting as the first elastic member 2 and an NBR rubber, to which foaming agent is added, acting as the second elastic member 3, are arranged at predetermined positions in a die designed according to the shape of the gasket. That is, the hard NBR rubber is placed at the bolt portion 11 and the NBR rubber to which foaming agent is added, is placed at the sealing portion 12. They are formed by press vulcanization and they are adhered to the stainless steel plate at the same time as vulcanization.

FIGS. 3, 4, 5, 6 and 7 show a second embodiment of the composite gasket 20 of the present invention, in which 4 is a first sheet member and 5 is a second sheet member.

Figure 6:
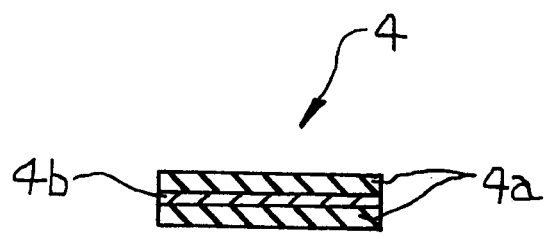
FIG. 6 is a cross-sectional view of an example showing a first sheet member in the second embodiment.
Figure 7:
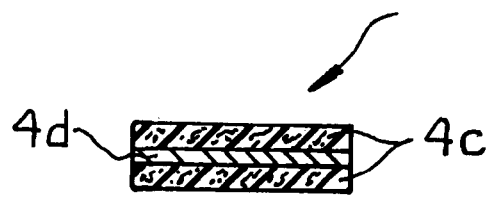
FIG. 7 is a cross-sectional view of an example showing a second sheet member in the second embodiment.

The first sheet member 4 consists in a steel plate coated with vulcanized rubber, in which a first cold rolled steel plate 4b is coated with an NBR rubber 4a acting as the first hard elastic member, as indicated in FIG. 6. On the other hand, a second sheet member 5 is fabricated by coating a second cold rolled steel plate 4d with an NBR foam rubber 4c acting as the second soft elastic member, as indicated in FIG. 7.

Figure 5:
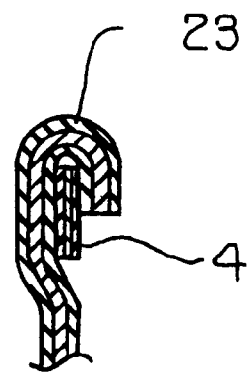
FIG. 5 is a diagram showing joining means (X) along line 5—5 in FIG. 3.

The first sheet member 4 is placed on the bolt portion 21, while the second sheet member is put on the liquid sealing portion 22 and they are joined with each other e.g. by means of mechanical caulkings 23 at positions where functions of the bolt portion and the sealing portion are not obstructed, as indicated in FIG. 5.

For fabricating the composite gasket 20, after having dissolved NBR rubber mixture, which will form the first hard elastic member, in a solvent, a cold rolled steel plate is coated with a solution thus obtained, which is vulcanized as it is to obtain a first sheet member. On the other hand, foaming agent is added to the NBR rubber mixture, which will form the second soft elastic member, and after having dissolved a mixture thus obtained in a solvent, a cold rolled steel plate is coated therewith, which is foamed in a vulcanizing process to obtain a second sheet member.

FIGS. 8, 9, 10, 11 and 12 show a third embodiment of the composite gasket 30 according to the present invention. Reference numerals 6 and 7 indicate a first and a second sheet member, respectively. The constructions thereof are identical to those indicated in FIGS. 6 and 7, respectively, and they are fabricated by the methods described previously. 8 is a central core member, for which e.g. a stainless steel plate is used. The first and the second sheet member 6 and 7 are superposed on both the surfaces thereof, arranged in predetermined positions, and joined therewith.

Figure 10:
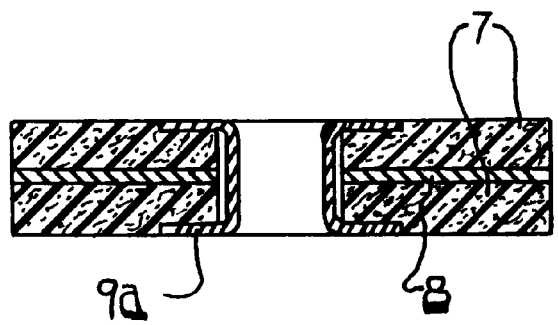
FIG. 10 is an enlarged view showing a part of a cross-sectional construction along a line 10—10 in FIG. 8.
Figure 11:
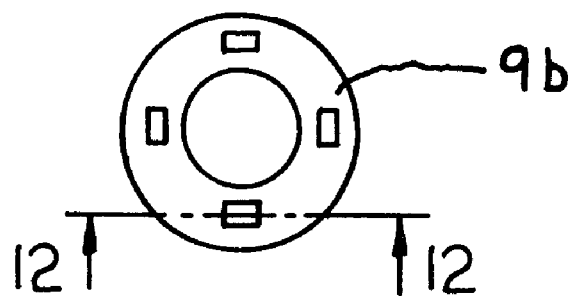
FIG. 11 is a plan view showing the part X in FIG. 8 in detail.
Figure 12:
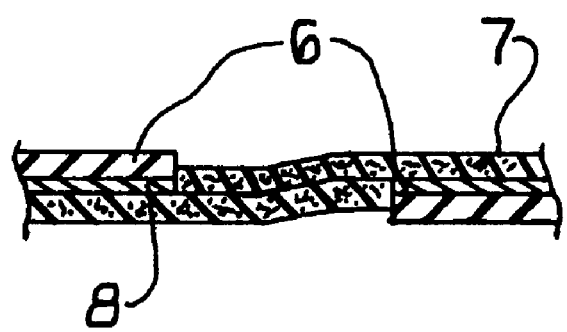
FIG. 12 is an enlarged view showing a part of a cross-sectional construction (caulking shape) along line 12—12 in FIG. 11.

For joining the first and the second sheet member 6 and 7 with the stainless steel plate acting as the central core portion 8, a method is adopted, by which they are secured mechanically to each other in one body at positions where functions of the bolt portion and the sealing portion are not obstructed after having superposed the formers on the latter. For example, as indicated in FIG. 10, the second sheet member 7 and the central core member 8 are made in one body at positions where the sealing-property is not obstructed by means of eyelets 9a. On the other hand, as indicated in FIGS. 11 and 12, the first sheet member 6 and the central core member 8 are made in one body at four positions by means of caulking 9b, which is an application of washer technique.

Figure 8:
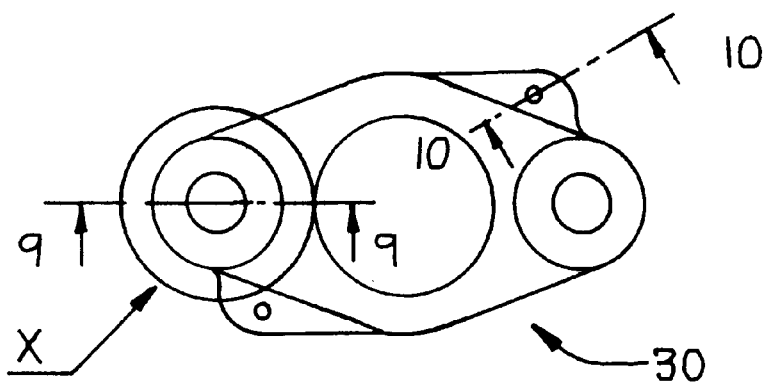
FIG. 8 is a plan view of a third embodiment of the present invention.
Figure 9:
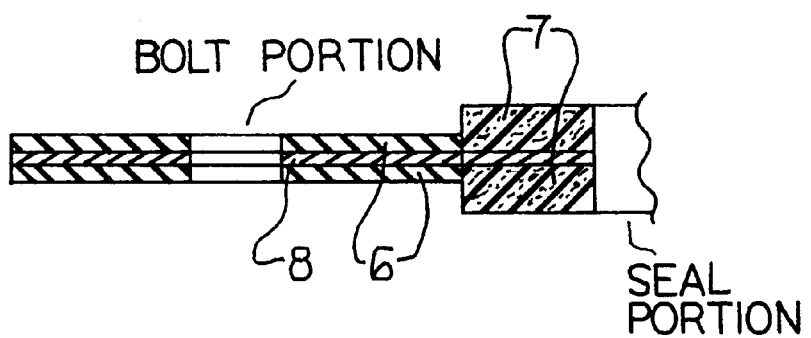
FIG. 9 is an enlarged view showing a part of a cross-sectional construction along line 9—9 in FIG. 8.
Figure 13:
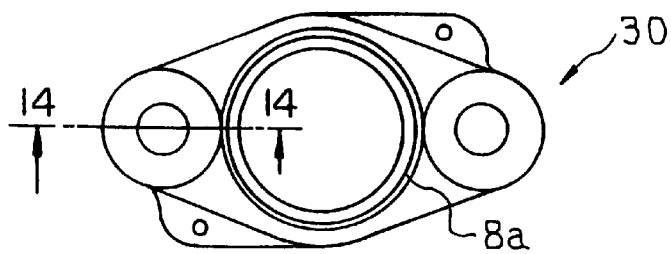
FIG. 13 is a plan view of a fourth embodiment of the present invention.
Figure 14:
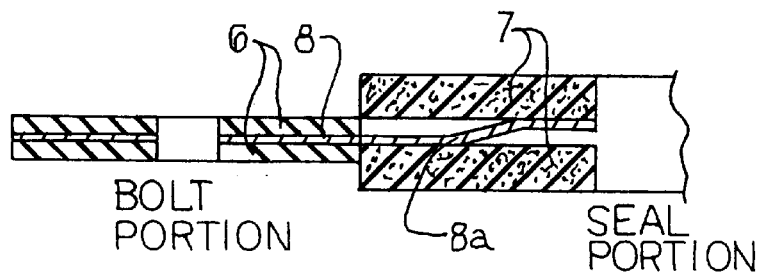
FIG. 14 is an enlarged view showing a part of a cross-sectional construction along line 14—14 in FIG. 13.

FIGS. 13 and 14 show a fourth embodiment, in which a bead is formed in the embodiment indicated in FIGS. 8 and 9. In the figures, 8a represents the bead formed along the periphery of the sealing portion of the central core member 8.

Figure 15:
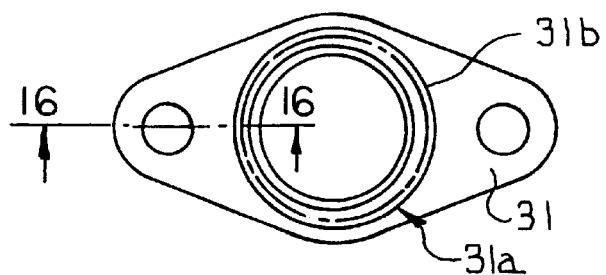
FIG. 15 is a plan view of a first example for comparison.
Figure 16:
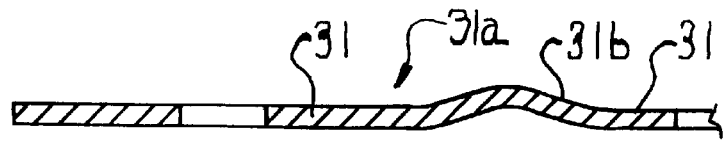
FIG. 16 is an enlarged view showing a part of a cross-sectional construction along line 16—16 in FIG. 15.

FIGS. 15 and 16 show a prior art gasket as a first example for comparison, which consists in a rubber coated steel plate 31, in which a cold rolled steel plate is coated with a solution obtained by dissolving NBR rubber in a solvent, which is vulcanized thereafter, and a bead 31b is formed on the sealing portion 31a.

Figure 17:
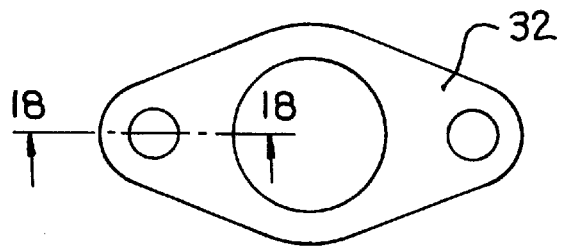
FIG. 17 is a plan view of a second example for comparison.
Figure 18:
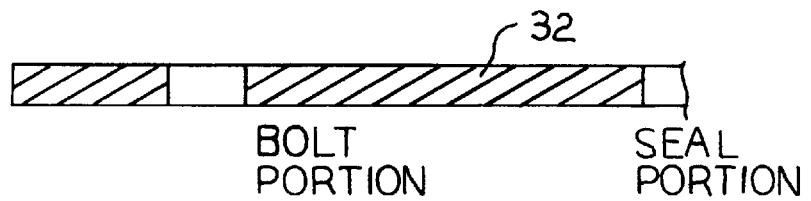
FIG. 18 is an enlarged view showing a part of a cross-sectional construction along line 18—18 in FIG. 17.

FIGS. 17 and 18 show another prior art gasket as a second example for comparison, which consists in a rubber coated steel plate 32, in which a cold rolled steel plate is coated with a solution obtained by dissolving NBR rubber mixture, to which foaming agent is added, in a solvent, which is foamed in a vulcanizing process.

Figure 19:
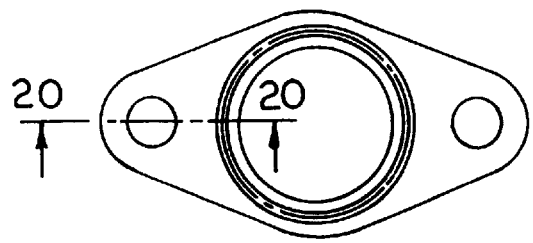
FIG. 19 is a plan view of a third example for comparison.
Figure 20:
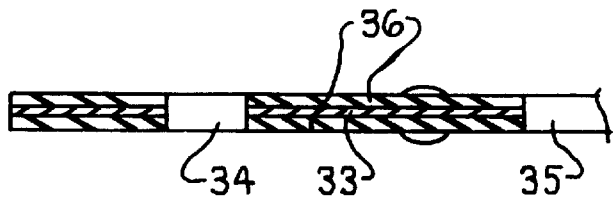
FIG. 20 is an enlarged view showing a part of a cross-sectional construction along line 20—20 in FIG. 19.

FIGS. 19 and 20 show still another prior art gasket as a third example for comparison. As indicated in the figures, NBR rubber 36 is formed by press vulcanization on a stainless steel plate (SUS304) 32 worked by a punching process into a gasket shape in a die having the gasket shape so that the NBR rubber 36 is arranged on the sealing portion 35 and the bolt portion 34 of the central core member 33 made of the stainless steel plate 32 and at the same time it is adhered by vulcanization thereto.

Several examples of specifications of the first to fourth embodiments of the present invention and the first to third examples for comparison are indicated in detail in TABLE 1. In the table, a sign (*) attached to the thickness of an elastic material indicates the thickness of the elastic material stuck to each surface of the rubber coated steel plate. For this reason, the overall thickness of the rubber coated steel plate is equal to the thickness of the metal plate+(the thickness of the elastic material×2).

Further, since the third example for comparison is for vibration isolation, the elastic material is classified as a soft elastic material for convenience.

TABLE 1

SPECIFICATIONS OF EMBODIMENTS AND EXAMPLES FOR COMPARISON

| | | EMBODIMENT | | | | EXAMPLE FOR COMPARISON | | |
|---|---|---|---|---|---|---|---|---|
| | | ① | ② | ③ | ④ | ① | ② | ③ |
| HARD | ELASTIC MATERIAL | | | | | | | |
| ELASTIC MATERIAL AND RUBBER COATED STEEL PLATE COATED | MATERIAL | | NBR RUBBER | | | NBR | — | — |
| | HARDNESS (Hs) | | 70 | | | 70 | — | — |
| | THICKNESS (mm) | 0.40 | 0.10* | 0.10* | 0.10* | 0.10* | — | — |
| | THICKNESS OF SINGLE BODY AT COMPRESSION | 0.35 | 0.09* | 0.09* | 0.09* | 0.09* | — | — |
| | METAL PLATE | | | | | | | |
| THEREWITH | MATERIAL | — | COLD ROLLED STEEL PLATE (SPCC) | | | SPCC | — | — |
| | THICKNESS (mm) WHOLE BODY | — | 0.30 | | | 0.30 | — | — |
| | THICKNESS (mm) | 0.40 | 0.50 | 0.50 | 0.50 | 0.50 | — | — |
| | THICKNESS OF SINGLE BODY AT COMPRESSION | 0.35 | 0.48 | 0.48 | 0.48 | 0.48 | — | — |
| | NUMBER OF SUPERPOSED LAYERS | 2 | 1 | 2 | 2 | 1 | — | — |

TABLE 1-continued

SPECIFICATIONS OF EMBODIMENTS AND EXAMPLES FOR COMPARISON

| | | EMBODIMENT | | | | EXAMPLE FOR COMPARISON | | |
|---|---|---|---|---|---|---|---|---|
| | | ① | ② | ③ | ④ | ① | ② | ③ |
| SOFT | ELASTIC MATERIAL | | | | | | | |
| ELASTIC MATERIAL AND RUBBER COATED STEEL PLATE COATED THEREWITH | MATERIAL | NBR FOAM RUBBER | | | | — | NBR FOAM | NBR |
| | HARDNESS (Hs) | | 30 | | | — | 30 | 50 |
| | THICKNESS (mm) | 0.50 | 0.50* | 0.50* | 0.50* | — | 0.50* | 2.0 |
| | THICKNESS OF SINGLE BODY AT COMPRESSION | 0.10 | 0.10* | 0.10* | 0.10* | — | 0.10* | 1.0 |
| | METAL PLATE | | | | | | | |
| | MATERIAL | — | COLD ROLLED STEEL PLATE (SPCC) | | | — | SPCC | — |
| | THICKNESS (mm) WHOLE BODY | — | | 0.20 | | — | | — |
| | THICKNESS (mm) | 0.50 | 1.20 | 1.20 | 1.20 | — | 1.20 | 2.0 |
| | THICKNESS OF SINGLE BODY AT COMPRESSION | 0.10 | 0.40 | 0.40 | 0.40 | — | 0.40 | 1.0 |
| | NUMBER OF SUPERPOSED LAYERS | 2 | 1 | 2 | 2 | — | 1 | 2 |
| CENTRAL CORE MEMBER | MATERIAL | SUS301 | — | SUS301H | | — | — | SUS301 |
| | THICKNESS (mm) | 0.20 | — | 0.20 | | — | — | 1.0 |
| | BEAD | NO | — | NO | YES | — | — | NO |
| | JOINING METHOD TO ELASTIC MATERIAL | ADHESION BY VULCANIZATION | — | MECHANICAL CAULKING | | — | — | ADHESION BY VULCANIZATION |

TABLE 2 shows evaluation results of the first to fourth embodiments of the present invention and the first to third examples for comparison. In the table, it is supposed that in measurements of the sealing pressure the initial clamping torque is 50 kgf-cm. Further thermal deterioration characteristics (including buckling) are measured after having left gaskets under a following condition:
Atmosphere: oxidation in air
Temperature: 130° C.
Duration: 200 hours

TABLE 2

EVALUATION RESULTS OF EMBODIMENTS AND EXAMPLES FOR COMPARISON

| | | EMBODIMENT | | | | EXAMPLE FOR COMPARISON | | | JUDGMENT |
|---|---|---|---|---|---|---|---|---|---|
| | | ① | ② | ③ | ④ | ① | ② | ③ | |
| SEAL | | | | | | | | | |
| SEALING PRESSURE (kgf/cm²) | INITIAL | 22 | 25 | 30 | 45 | 48 | 30 | 25 | GREATER VALUES INDICATE BETTER RESULTS |
| | AFTER THERMAL DETERIORATION | 20 | 22 | 24 | 43 | 45 | 12 | 7 | |
| CREEP | | | | | | | | | |
| REMAINING TORQUE (kgf-cm) | | 38 | 45 | 41 | 42 | 47 | 19 | 20 | |
| PERMANENT STRESS DUE TO COMPRESSION (mm) | | 0.06 | 0.03 | 0.03 | 0.03 | 0.02 | 0.9 | 1.2 | SMALLER VALUES INDICATE BETTER RESULTS |
| VIBRATION ISOLATING PROPERTY | | | | | | | | | |
| RESONANCE | INITIAL | 150 | 155 | 102 | 110 | 800 | 94 | 100 | |

TABLE 2-continued

EVALUATION RESULTS OF EMBODIMENTS AND EXAMPLES FOR COMPARISON

|  |  | EMBODIMENT | | | | EXAMPLE FOR COMPARISON | | | JUDGMENT |
|---|---|---|---|---|---|---|---|---|---|
|  |  | ① | ② | ③ | ④ | ① | ② | ③ |  |
| FREQUENCY (Hz) | AFTER THERMAL DETERIORATION | 170 | 172 | 120 | 128 | 880 | 195 | 250 |  |

According to the evaluation results indicated in TABLE 2, it can be seen that all the examples for comparison have both merits and demerits in characteristics, while all the embodiments indicate good characteristics. In particular, the third embodiment is excellent in the vibration isolation and not bad in the sealing property and the creeping property. In addition, a high sealing property can be expected for the fourth embodiment, in which a bead is formed.

Further, according to the present invention, it is preferable that the second soft elastic material is as thick as or suitably thicker than the first hard elastic material. An appropriate thickness at this time is such a thickness that when the second soft elastic material is clamped by means of bolts, a state is realized where it is not completely compressed, but the first hard elastic material plays a role of a stopper so that the second soft elastic material is compressed up to the thickness of the first hard elastic material at that time and that softness of the second soft elastic material suitably remains. This state is efficient also for the sealing property and the vibration isolation.

As explained above, by the composite gasket according to the present invention, since the first hard elastic member having a small compression deformation is arranged at a portion which is directly clamped by the bolt portion, while the second soft elastic member is arranged at a portion where the sealing property and the vibration isolation are required, it is possible to suppress decrease in the clamping torque in a creeping environment such as thermal deterioration, etc. In addition, it is possible to define an appropriate amount of compression of the second soft elastic member and further it is possible to avoid contact of different metal pieces not only at the sealing surface but also at the bolt portion. Consequently, according to the present invention, it is possible to realize a gasket, in which high sealing property and vibration isolation (floating) are compatible and torque-down of the bolt portion even under thermal deterioration in a long term is suppressed and in addition which is cheap.

What is claimed is:

1. A composite gasket comprising:
   a central core member having a bolt portion and a liquid sealing portion;
   a first elastic member completely covering an exteriorly exposed first portion of said central core member containing said bolt portion, said first elastic member having a hard and a small compression deformation characteristic;
   a second elastic member completely covering an exteriorly exposed second portion of said central core member containing said liquid sealing portion separate from said bolt portion, said second elastic member having a soft and a high sealability and vibration isolation characteristic, and
   wherein said first and second elastic members cover the whole central core member and said second elastic member is as thick as or thicker than said first elastic member.

2. A composite gasket according to claim 1, wherein said first elastic member is made of vulcanized rubber; said second elastic member is made of foam rubber; and said central core member is a metal plate, in which said vulcanized rubber and said foam rubber are adhered to said bolt portion and said liquid sealing portion, respectively, on both of the surfaces of said metal plate.

3. A composite gasket according to claim 2, wherein a bead is formed along the periphery of said sealing portion in said metal plate acting as said central core member.

4. A composite gasket according to claim 3, wherein said metal plate acting as said central core member is a spring steel plate.

5. A composite gasket comprising:
   a central core member having a first metal plate with a bolt portion thereon and a second metal plate with a liquid sealing portion thereon;
   a first sheet member having a first elastic characteristic of relatively hard material directly adhered to an exteriorly exposed surface of said first metal plate, said first elastic characteristic being a small elastic deformation characteristic;
   a second sheet member having a second elastic characteristic of soft material directly adhered to an exteriorly exposed surface of said second metal plate, said second elastic characteristic being a high sealability and vibration isolation characteristic;
   said first sheet member entirely covering a first portion of said central core member containing said bolt portion of said central core member;
   said second sheet member entirely covering a second portion of said central core member containing said liquid sealing portion separate from said bolt portion; and
   wherein said first and second sheet members cover the whole of said central core member and said second sheet member is as thick as or thicker than said first sheet member.

6. A composite gasket according to claim 5, wherein said first and said second sheet members are respectively adhered to both of the surfaces of said first and said second metal plates or linked mechanically relatively loosely thereto at positions so that said bolt portion and said liquid sealing portion are not obstructed by said first and second sheet members.

7. A composite gasket according to claim 4, wherein a bead is formed along the periphery of said liquid sealing portion in one of said first and second metal plates acting as said central core member.

8. A composite gasket according to claim 7, wherein said first and said second metal plates acting as said central core member are a spring steel plate.

9. A composite gasket providing a seal between passages respectively in two adjacent parts, comprising:

a one-piece central core including planar upper and lower surfaces, a bolt-receiving portion, and a passage sealing portion, said bolt-receiving portion having a first aperture therethrough adapted to receive a bolt for securing the two parts together, said passage sealing portion having a second aperture adapted to sealingly join the passages of the two parts;

a first elastic member entirely covering said upper and lower surfaces at said bolt-receiving portion of said central core, said first elastic member on said bolt portion defining a first thickness of the gasket and having a hard and small compression deformation characteristic;

a second elastic member entirely covering said upper and lower surfaces at said sealing portion of said central core, said second elastic member on said sealing portion defining a second thickness of the gasket and having a soft, high sealability and vibration isolation characteristic, and said second elastic member is at least as thick as said first elastic member, said first elastic member preventing over compression of said second elastic member between the two parts so that said high sealability and vibration isolation characteristic thereof is maintained.

10. The composite gasket according to claim 9, wherein said first elastic member is harder than said second elastic member.

11. The composite gasket according to claim 9, wherein said central core is a metal plate, and said first and second surfaces are parallel.

12. The composite gasket according to claim 9, wherein said first and second elastic members planarly extend sheet-like over said first and second surfaces.

13. The composite gasket according to claim 12, wherein said first elastic member includes first and second layers respectively joined to said upper and lower surfaces, said first and second layers being separate from each other, and wherein said second elastic member includes third and fourth layers respectively joined to said upper and lower surfaces, said third and fourth layers being separate from each other.

14. The gasket according to claim 9, wherein the periphery of said first aperture includes in the axial direction a first layer of said first elastic member, said central core member, and a second layer of said first elastic member.

15. The gasket according to claim 9, wherein the periphery of said second aperture includes in the axial direction a first layer of said second elastic member, said central core, and a second layer of said second elastic member.

* * * * *